(12) United States Patent
Gerat et al.

(10) Patent No.: US 7,693,604 B2
(45) Date of Patent: Apr. 6, 2010

(54) MULTI-AXIS ROBOT PROVIDED WITH A CONTROL SYSTEM

(75) Inventors: Vincent Gerat, Saint Jorioz (FR); Pierre Perillat, Annecy-le-Vieux (FR); Jean-Michel Bonnet Des Tuves, Saint Ferreol (FR)

(73) Assignee: Staubli Faverges, Faverges (FR)

( * ) Notice: Subject to any disclaimer, the term of this patent is extended or adjusted under 35 U.S.C. 154(b) by 1186 days.

(21) Appl. No.: 10/542,261

(22) PCT Filed: Feb. 3, 2004

(86) PCT No.: PCT/FR2004/000245

§ 371 (c)(1),
(2), (4) Date: Jul. 15, 2005

(87) PCT Pub. No.: WO2004/079464

PCT Pub. Date: Sep. 16, 2004

(65) Prior Publication Data

US 2006/0106492 A1 May 18, 2006

(30) Foreign Application Priority Data

Feb. 4, 2003 (FR) .................................. 03 01264

(51) Int. Cl.
*G06F 19/00* (2006.01)
(52) U.S. Cl. ..................... 700/245; 700/247; 74/490.01; 74/490.02; 74/490.03; 74/490.07; 318/568.11; 318/568.12; 318/568.16; 318/568.2

(58) Field of Classification Search ................. 318/625, 318/562, 567, 563, 34, 49, 113, 568.11, 568.12, 318/568.16, 568.2; 361/600, 728; 700/245, 700/254, 247; 901/23, 26, 27, 29; 74/490.01, 74/490.02, 490.03, 490.07
See application file for complete search history.

(56) References Cited

U.S. PATENT DOCUMENTS 4,396,987 A * 8/1983 Inaba et al. .................. 700/249
(Continued)

FOREIGN PATENT DOCUMENTS

EP 0 777 167 6/1997
(Continued)

OTHER PUBLICATIONS

Khosla P et al., A Novel Technology for Manipulators: Reconfigurable Systems, Advances in Instrumentation, Instrument Society of America, Research Triangle Park, US, vol. 43, No. Part 4, 1988 pp. 1763-1774.

(Continued)

*Primary Examiner*—Khoi Tran
*Assistant Examiner*—Jaime Figueroa
(74) *Attorney, Agent, or Firm*—Dowell & Dowell PC

(57) ABSTRACT

The robot comprises: —a controller (C), including power modules (22) for supplying the motors (10) of the arm (A) of the robot (R), a CPU unit (26), for calculation and processing and connection means (52, B), between the arm (A), the power modules (22) and the CPU unit (26). The connection means (52, B) comprise a single functional bus (B) which connects a control unit (30), associated with the CPU unit (26), firstly to the power modules (22) and, also, to the digital interfaces (14) with the sensors (12) of the arms (A). Said interfaces (14) are either integrated with the arm (A) or located in the immediate vicinity thereof.

13 Claims, 1 Drawing Sheet

U.S. PATENT DOCUMENTS

| | | | |
|---|---|---|---|
| 4,611,296 A * | 9/1986 | Niedermayr | 700/260 |
| 4,786,847 A * | 11/1988 | Daggett et al. | 318/568.2 |
| 4,794,513 A * | 12/1988 | Muller | 700/63 |
| 4,878,002 A | 10/1989 | Heatzig et al. | |
| 4,965,500 A * | 10/1990 | Mizuno et al. | 318/568.13 |
| 5,047,700 A * | 9/1991 | Szakaly | 318/568.1 |
| 5,940,292 A * | 8/1999 | Kurakake et al. | 700/56 |
| 5,978,593 A * | 11/1999 | Sexton | 710/1 |
| 6,091,219 A * | 7/2000 | Maruo et al. | 318/562 |
| 6,208,104 B1 * | 3/2001 | Onoue et al. | 318/568.11 |
| 6,356,806 B1 * | 3/2002 | Grob et al. | 700/245 |
| 6,442,451 B1 * | 8/2002 | Lapham | 700/245 |
| 6,675,070 B2 * | 1/2004 | Lapham | 700/245 |

FOREIGN PATENT DOCUMENTS

| | | |
|---|---|---|
| EP | 0 881 551 | 12/1998 |
| JP | 10 178437 | 9/1998 |

OTHER PUBLICATIONS

Schneider G. Feuerprobe Bestanden. Pc-Technologie I Der Roboter-Steuerungstechnik Erforgreich Eingefuert Elektronik, Franzis Verlag GMBH. Munchen, DE, vol. 47, No. 8 Apr. 14, 1998, pp. 82, 84, 86-88.

* cited by examiner

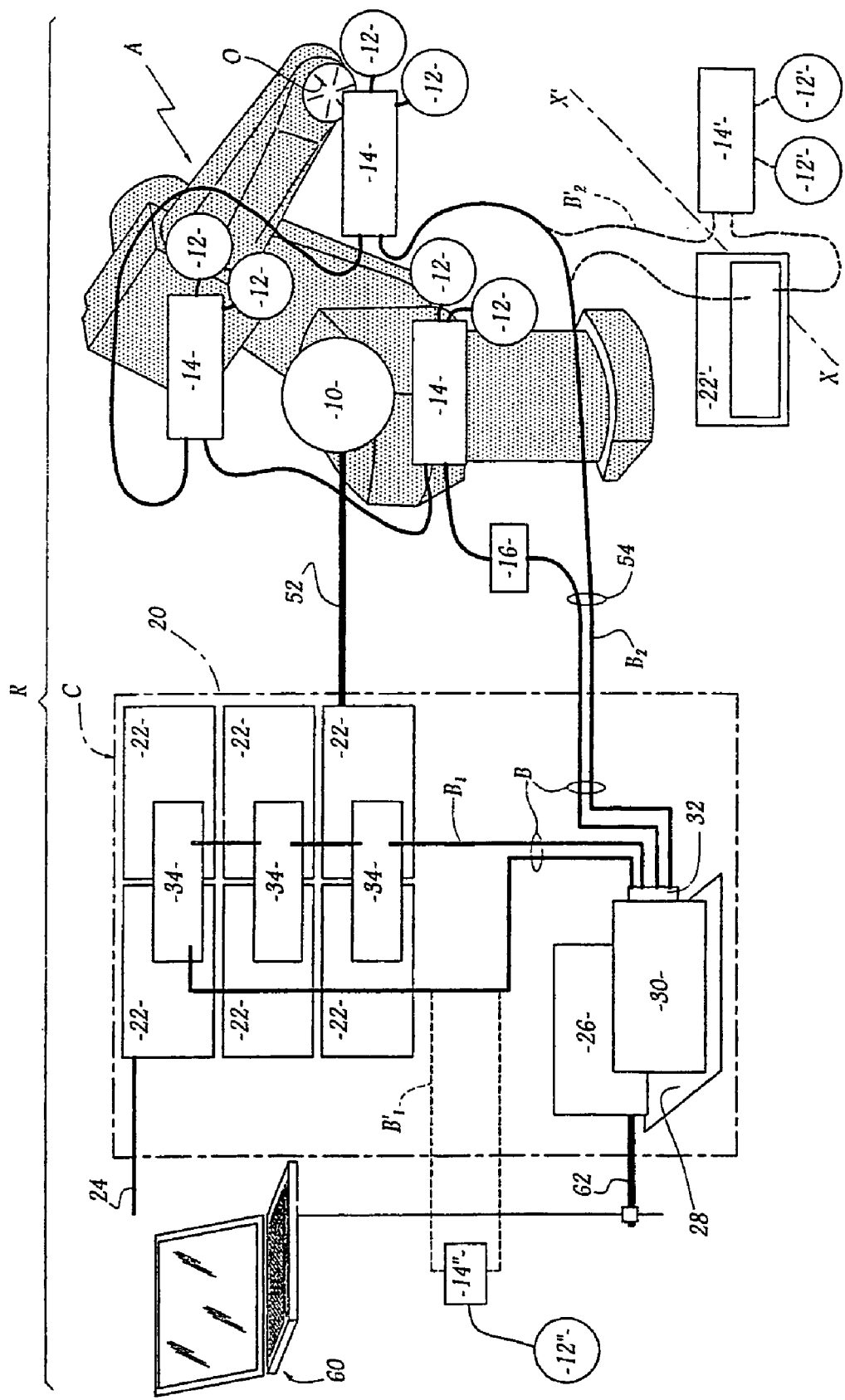
Single figure

MULTI-AXIS ROBOT PROVIDED WITH A CONTROL SYSTEM

BACKGROUND OF THE INVENTION

1. Field of the Invention

The invention relates to a multi-axis robot provided with a control system.

2. Brief Description of the Related Art

It is known that multi-axis robots can be controlled by supplying their electric motors with control signals generated from a calculation and processing unit in which the path of the robot is determined. For the path computation to be effective, to have the abovementioned unit work in closed loop mode, by using feedback signals originating from position sensors carried by the arm of the robot, is known, for example from U.S. Pat. No. 4,786,847. In the known robots, a large number of cables must be installed between the arm and its control unit, which leads to long connection and wiring times and not inconsiderable risks of error resulting in complex and costly debugging operations.

The use of an optical fiber bus to connect a digital controller to amplifiers each linked to an encoder by a conventional line is known from EP-A-0 777 167. These links between the amplifiers and the coders make the job of installing these devices lengthy and complicated.

Moreover, JP-A-10 178 437 provides for encoders to be linked by a bus to an external computer, independently of the power part of the installation.

It is these drawbacks that the invention seeks in particular to remedy by proposing a novel architecture for a robot provided with a control system which simplifies the production of the controller, on the one hand, and of the arm, on the other hand, and the installation of this robot in its place of use. The invention also seeks to improve the quality and speed of transfer of the control and feedback signals.

SUMMARY OF THE INVENTION

In this spirit, the invention relates to a multi-axis robot comprising an arm for moving a tool in space and actuated by electric motors, and a control system comprising:

a controller which includes at least one power module for supplying the motors and at least one calculation and processing unit used in particular to compute the path of the arm and generate control signals for the abovementioned module or modules;

link means between the arm, the power module or modules and the abovementioned unit, these link means being used at least to supply the motors from the power module or modules and control this or these modules by the calculation and processing unit, and to, transmit feedback signals from the arm to this unit and/or this or these modules.

This system is characterized in that the abovementioned link means comprise a single functional bus linking a control unit associated with the calculation and processing unit, on the one hand, to the power module or modules and, on the other hand, to at least one digital interface with at least one position sensor on the arm, this interface being, incorporated in the arm or located in its immediate vicinity.

With the invention, the feedback information relating to the position and the speed of the moving elements of the robot, as well as to the current consumed by the various motors, is available for the calculation and processing unit at the bus frequency. Furthermore, the digital signals traveling on the bus in digital form are relatively undisturbed by the ambient noise, unlike analog signals. Optimization of the path control is obtained by the centralized processing of the closed loops. The use of the interface or interfaces allows for serializing the information originating from digital sensors or for digitizing and serializing the information from analog sensors, then for conveying the information to the serial bus. The invention retains the advantages of a system functionally centralizing path generation and closed-loop controls. The interface or interfaces are also used to compute, as near as possible to the sensors or encoders, the speeds and/or accelerations of the moving parts, at a frequency that is a multiple of that of the bus, which reduces the delay between the position, speed and/or acceleration information, in order to provide better closed-loop control. The fact of using a functional bus minimizes the number of conductor cables in the installation, particularly inside the arm, hence a better layout of the connecting cable or cables, relaxed dimensional constraints for the elements of the arm, better accessibility to the elements included in this arm and ease of obtaining mobility of this arm because the minimum bending radius of the bus can be relatively low. The robot according to the invention is more economical to design and build and can benefit from algorithms that make it faster and more accurate than those of the prior art.

According to a particularly advantageous aspect of the invention, the single functional bus is divided into at least two structural buses linking, for the first, the control unit to the power module or modules and, for the second or second and subsequent modules, the control unit to the interface or interfaces. The fact of having at least two separate structural buses means that each of these buses can be adapted to the place in which it is installed: the first bus can be metallic, particularly made of copper, whereas another bus can, for example, be made of optical fibers, this type of bus being particularly immune to ambient electromagnetic noise and able to be longer while maintaining high speed. The fact of using several structural buses circumvents the problem caused by the limitations of their bandwidth for adding, as necessary, more elements or more information processed for each element.

Advantageously, the control unit is linked to the calculation and processing unit by a PCI (Peripheral Component Interconnect) type bus. As a variant, the control unit is incorporated in the calculation and processing unit.

An identification and calibration card can be included on the arm or located in its immediate vicinity, this card being incorporated in the bus. This makes it easy to download the parameters specific to the robot to the calculation and processing unit. A connection can then said to be "plug and play".

The or each structural bus can be designed to be extended by additional connection means to at least one external unit, such as a seventh axis, in particular a conveyor axis, or any unit processing information, such as a safety device.

The link means can, furthermore, comprise a power conductor linking the abovementioned module or modules to the robot, independently of the functional bus.

The first structural bus is advantageously connected directly or indirectly to power modules, each dedicated to a motor of the robot. It is also possible to provide for the abovementioned interface to be an interface card for computing the speed and/or the acceleration of the movement measured by the or each associated sensor, serializing its output signal and, where appropriate, first digitizing the output signals of the sensor or sensors when they are analog. As a variant, the interface concerned is incorporated in the associated sensor, with the same functions as above.

BRIEF DESCRIPTION OF THE DRAWINGS

The invention will be better understood and other advantages of the latter will become more clearly apparent in light of the description that follows of an embodiment of a multi-axis robot and its control system according to the invention, given purely by way of example and with reference to the appended drawing in which the single FIGURE is a theoretical diagrammatic representation of an associated control system and multi-axis robot.

DESCRIPTION OF THE PREFERRED EMBODIMENT

The arm A of the robot R represented in the FIGURE is disposed along a conveyance path indicated by a direction X-X'. This arm is provided with six motors, each for moving a moving part of the arm about one of its six axes to move a tool O in space. These motors are represented by a motorization set 10 in the FIGURE. In practice, they are distributed inside the arm A. Six analog position sensors or encoders 12 are distributed in the robot R and used to measure the movements of the arm about each of its six axes.

Three interface cards 14 are mounted on the arm A and are each associated with two sensors 12. Each card 14 is used to digitize and serialize the analog signal output from a sensor or encoder 12. Each card 14 is also used to compute the first drift and/or the second drift of the duly generated signal, which is used to determine the speed and/or corresponding acceleration for the moving part concerned of the robot R. Since the cards 14 are located near the sensors or encoders 12, the drift computations can be performed with a high frequency, of around 20 kHz, whereas the information frames are transmitted at 10 kHz.

In practice, the cards 14 can, according to the construction choices, be incorporated in the sensors 12, common to two sensors and distributed in the arm A, as represented, or disposed at the foot of the arm A. A single card can take the place of the various abovementioned cards 14.

The robot R also includes a controller C controlling the arm A, this controller comprising an enclosure 20 housing six power modules 22 receiving power supply via a cable 24. Each module 22 is dedicated to one of the motors of the arm A, these six modules 22 being linked to the arm A by a first link cable 52, with eighteen conductors. In practice, the motors of the subassembly 10 are three-phase motors and each module 22 is linked to the corresponding motor by three conductors.

A calculation and processing unit 26, commonly called a "CPU", is also disposed inside the enclosure 20 and is linked by PCI bus 28 to a control card 30 provided with an interface 32.

As a variant, the card 30 can be incorporated in the card 26.

An external portable computer 60 can be linked by an Ethernet link 62 to the unit 26 for its programming and/or to display its operating parameters.

The unit 26 is used to compute the path of the robot R and generate control signals for each of the modules 22 which in turn each control a motor of the subassembly 10. To control these modules 22 by taking into account the actual behavior of the arm A, the assembly formed by the elements 26 to 30 is linked by a single functional bus B, on the one hand, to three cards 34 each controlling two modules 22 and, on the other hand, to the three interface cards 14.

The bus B is divided into two structural buses $B_1$ and $B_2$.

The bus $B_1$, made of copper and contained in the enclosure 20, is used to convey to the cards 34 the control signals from the modules 22 and, in this way, control the motors of the subassembly 10. Information also circulates from the cards 34 to the card 30 via the bus $B_1$.

The second structural bus $B_2$ is formed by optical fibers and comprises a link cable 54 between the interface 32 and an identification and calibration card 16 mounted near the foot of the arm A, this card 16 being linked, in series, by the second bus $B_2$ to each of the cards 14.

The fact that the bus $B_2$ is made of optical fibers provides immunity from the electromagnetic disturbances that can result from the operation of the motors of the subassembly 10 or of the encoders 12.

For the unit 26, the two structural buses $B_1$ and $B_2$ form a single functional bus B with which it interacts, via the card 30, to send or receive control signals.

Given the use of the structural buses $B_1$ and $B_2$, the transmission of information to the control card 30 is particularly fast, in practice completed with a repeat interval of less than 100 microseconds. The information also travels rapidly between the elements 26 and 30, via the PCI bus 28.

As represented by a broken line in the FIGURE, the structural bus $B_2$ can be open to incorporate additional connection means $B'_2$ to control an external axis, such as a conveyor axis, with a power module 22', two sensors 12' and an interface card 14'.

Similarly, connection means $B'_1$ can be used to link the bus $B_1$ to an interface card 14" associated with a sensor 12", for example within a safety device.

Thus, the invention makes the control system highly flexible and able to be adapted to its working environment. In particular, there is no need to add cables to the link between the controller C and the arm A when the control of an external axis needs to be added.

Installation of the robot R and its control system is particularly easy because the information stored on the card 16 makes it possible to consider having the robot R recognized by the controller C on connecting the bus $B_2$ between the interface 32 and this card 16.

The invention significantly reduces the design, production and wiring costs of the control system of a robot, while the information collected, in particular regarding positions, speeds and accelerations of the moving parts of the robot, is available as fast as and with greater accuracy than in the most powerful devices with structurally centralized system with parallel bus.

The invention is represented with a functional bus formed by two structural buses $B_1$ and $B_2$. However, a single bus or, conversely, more than two structural buses can be provided.

The invention is not limited to robots provided with analog position sensors. It can also be implemented with digital sensors, in which case the interface provided by the cards 14 of the example described can be incorporated in each sensor.

The identification and calibration card 16 can be provided in the controller C and not on the arm A, in which case the elements A and C are paired because it is the card 16 which enables the unit 26 to "recognize" the arm A.

The invention claimed is:

1. A multi-axis robot comprising an arm for moving a tool in space and actuated by electric motors, and a control system including:

At least one digital interface card connected to at least one position sensor associated with the arm and being used for serializing an output signal therefrom, the interface card being integrated into the arm;

A controller controlling the arm and including at least one power module for supplying power to the motors and at least one calculation and processing unit used to compute a path of the arm and generate control signals for the at least one power module, and the at least one calculation and processing unit;

Link means between the arm, the at least one power module and the calculation and processing unit, the link means permitting at least the supply of electricity to the motors from the at least one power module; and Wherein the link means includes a single functional bus (B) formed by at least one structural bus, the single functional bus linking a control unit of the calculation and processing unit to the at least one power module and to the at least one digital interface card and the single functional bus enabling the at least one power module to be controlled by the at least one calculation and processing unit and feedback signals to be transmitted from the arm to the control unit and/or the at least one power module, at a frequency of the single functional bus.

2. The robot as claimed in claim 1 wherein the single functional bus (B) includes at least two structural buses ($B_1$, $B_2$):

A first structural bus linking the control unit to the at least one power module; and A second structural bus linking the control unit to the at least one digital interface card.

3. The robot as claimed in claim 2, wherein the first structural bus is a metallic bus ($B_1$) made of copper.

4. The robot as claimed in claim 2, wherein the second structural bus is an optical fiber bus ($B_2$).

5. The robot as claimed in claim 1, wherein the control unit is linked to the at least one calculation and processing unit by a PCI type bus.

6. The robot as claimed in claim 1, wherein the control unit is incorporated in the at least one calculation and processing unit.

7. The robot as claimed in claim 1, including an identification and calibration card incorporated in the functional bus (B).

8. The robot as claimed in claim 1 wherein each structural bus is designed to be extended by additional connection means) to interact with at least one external unit processing information.

9. The robot as claimed in claim 1, wherein the link means also includes a power conductor linking the at least one module to the arm (A), independently of the functional bus (B).

10. The robot as claimed in claim 2, wherein the first structural bus ($B_1$) is connected to a plurality of power modules, each dedicated to a separate motor of the robot.

11. The robot as claimed in claim 1, wherein the at least one digital interface card computes the speed and/or the acceleration of the movement measured by an associated sensor, serializes its output signal and, where appropriate, digitizes the output signals of the associated sensor when it is analog.

12. The robot as claimed in claim 1, the at least one digital interface card is incorporated in an associated sensor and is for computing a speed and an acceleration of the movement measured by the associated sensor, serializing its output signal and, where appropriate, digitizing the output signal of the associated sensor when it is analog.

13. The robot as claimed in claim 1 wherein the at least one power supply module, the calculation and processing unit, the control unit and a first structural bus are installed within a housing of the controller.

* * * * *